Aug. 30, 1966
T. H. PAULSEN
3,270,074
PROCESS FOR THE PRODUCTION OF PURE METHYLNAPHTHALENE
Filed Feb. 5, 1963
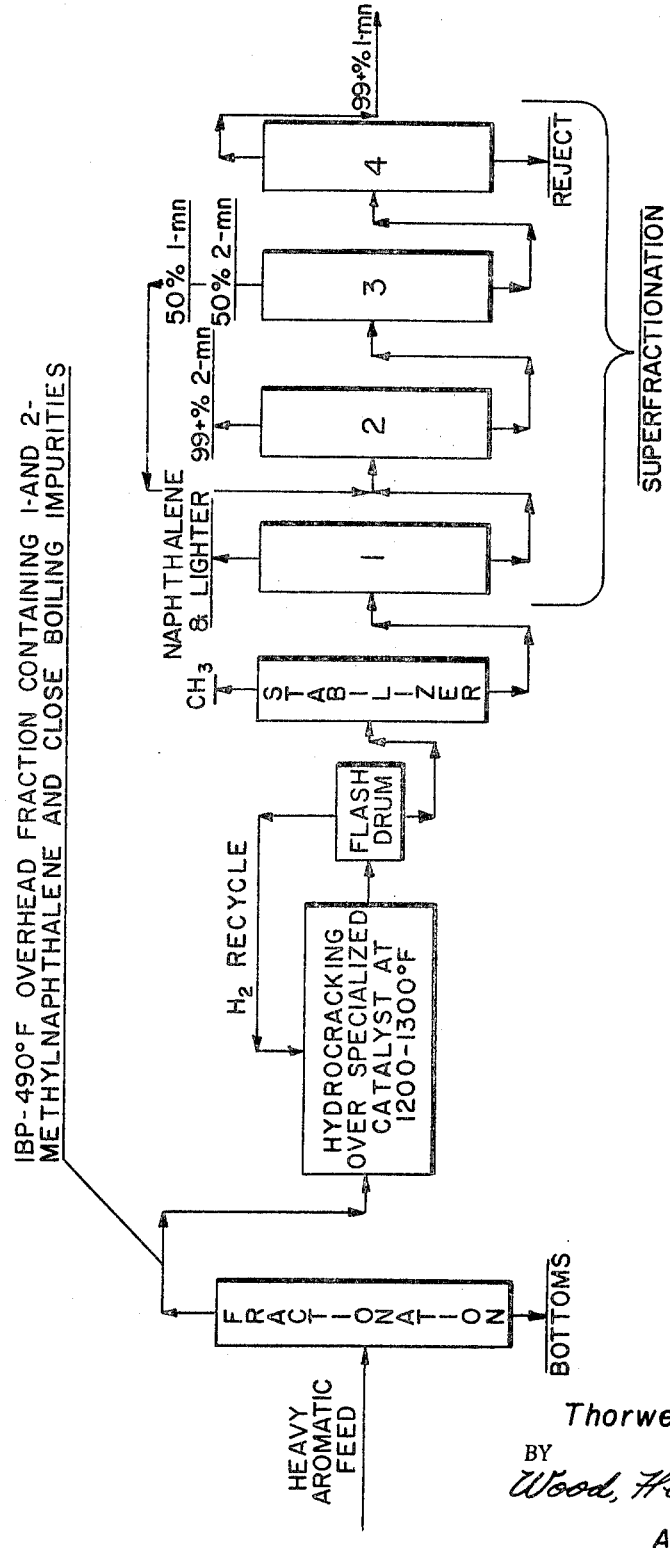
INVENTOR.
Thorwell H. Paulsen
BY
Wood, Herron & Evans
ATTORNEYS 3,270,074
PROCESS FOR THE PRODUCTION OF PURE
METHYLNAPHTHALENE
Thorwell H. Paulsen, Breezemont, Ashland, Ky., assignor to Ashland Oil & Refining Company, Ashland, Ky., a corporation of Kentucky
Filed Feb. 5, 1963, Ser. No. 256,451
8 Claims. (Cl. 260—674)

This invention relates to the production of alpha- and beta-methylnaphthalene in very high purity.

Alpha - methylnaphthalene, or 1 - methylnaphthalene, boils at 472° F., and may be represented structurally as,

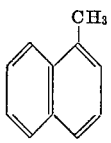

Beta-methylnaphthalene, or 2-methylnaphthalene, boils about 6° F. lower, at 466° F., and may be structurally represented as,

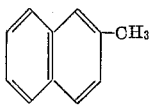

Beta-methylnaphthalene is used for the production of vitamin K, and at the present time is produced by a very laborious process of fractional crystallization. Alpha-methylnaphthalene is also valuable in pure form as an intermediate for further processing.

The methylnaphthalene isomers occur in substantial proportions in heavy catalytic reformates, in which they are present in admixture with naphthalene, higher boiling alkyl naphthalenes including dimethylnaphthalene, ethylnaphthalenes and trimethylnaphthalenes, other polynuclear aromatic compounds such as fluorene, indene, and acenaphthene, as well as long chain paraffins having boiling points in the 400 to 600° F. range, and high boiling alkylbenzenes boiling in this general range. In general, such reformates are highly complex mixtures and contain compounds whose boiling points are so close to those of the two-methylnaphthalene isomers that it is virtually impossible to separate the methylnaphthalene isomers from them with any degree of purity by fractionation alone. It has therefore been necessary in the past to recover the beta-methylnaphthalene by very careful and laborious fractional crystallization. At best, fractionally crystallized beta-methylnaphthalene has never been available commercially in purities higher than about 90%, and the alpha isomer has not been available in high purities except as a laboratory sample.

I have discovered a process whereby both alpha- and beta-methylnaphthalenes may now be recovered from heavy aromatic fractions in very high purities, i.e., at a minimum purity of 99.0%. This separation is accomplished by a three-stage process wherein a stock containing alpha- and beta-methylnaphthalenes in admixture with other close boiling compounds is first fractionated to a true end boiling point of about 490–500° F., that is, to an end point which is just slightly above the boiling point of alpha-methylnaphthalene. Following this, the fractionated stock is subjected to a very specialized selective hydrocracking operation by which I have found that virtually all the close-boiling contaminants mixed with the methylnaphthalenes, including long-chain paraffins and high-boiling alkylbenzenes, can be selectively cracked to form lower boiling compounds. Pure alpha- and beta-methylnaphthalene are then separated from the so produced lower boiling contaminants by a precise fractionation technique.

The drawing is a diagrammatic flow sheet illustrating a preferred method of practicing this invention.

Any stock which contains alpha- and beta-methylnaphthalene at economically advantageous quantities can be used as the feed in this process, but I prefer to use a heavy reformate fraction, which contains relatively large quantities of methylnaphthalenes. The production of the heavy reformate itself is not a part of this invention, and suitable reformates are produced by several well known processes with which those skilled in the art will be familiar. The heavy reformate may, for example, have a boiling range of about 300° to 500 or 600° F. From the yield standpoint, it is desirable that the paraffin content of the feed be as low as possible, although this is not critical to the practice of the invention because the paraffins are destroyed in the subsequent hydrocracking operation. Alternatively, so-called cycle stock or heavy cycle oil, which is a heavy fraction of a catalytically cracked gas oil, is a very suitable feed for the practice of this invention.

The aromatic-containing stock is fractionated to an end boiling point of about 490–500° F. This eliminates from the stock components which boil substantially higher than the methylnaphthalene isomers. These components dilute the methylnaphthalenes; more significantly however, it has been established that these higher boiling compounds, if not removed, would in the subsequent hydrocracking operation crack to form in part other lower boiling contaminants which have boiling points close to those of alpha- or beta-methylnaphthalene, from which the latter could not be separated by fractionation. Therefore, by the removal of these higher boiling compounds initially, their conversion to lower boiling contaminants in the subsequent step of this process is foreclosed.

The end boiling point of the fractionated stock should be slightly higher than that of alpha-methylnaphthalene, so that no substantial proportion of the methylnaphthalenes is lost in the fractionation process as the higher boiling contaminants are removed. With present fractionating techniques, it is convenient to fractionate to a temperature which is about 17 or 20° higher than the boiling point of alpha-methylnaphthalene.

The inspection of a typical heavy reformate fractionated according to these criteria is given for purposes of illustration:

Table I

Analysis of fractionated stock

| | |
|---|---|
| Gravity, °API | 17.3 |
| Distillation, ASTM: | ° F. |
| IBP | 379 |
| 5 | 386 |
| 10 | 393 |
| 20 | 402 |
| 30 | 405 |
| 40 | 411 |
| 50 | 421 |
| 60 | 430 |
| 70 | 440 |
| 80 | 453 |
| 90 | 463 |
| 95 | 470 |
| EP | 495 |

The fractionated stock is then subjected to a specialized hydrocracking operation in the presence of hydrogen, wherein compounds other than the methylnaphthalenes are cracked to lighter boiling compounds more rapidly than the methylnaphthalenes are cracked. It has been found that the methylnaphthalenes are relatively stable under certain hydrocracking conditions and in the presence of a certain catalyst, and tend to crack at a much slower rate than the compounds with which they are typically mixed, including paraffins and high boiling alkylbenzenes. Thus, the alkylbenzenes are cracked to alkyl benzene compounds having boiling points sufficiently lower than the methylnaphthalenes that the methylnaphthalenes can thereafter be fractionated from them. Similarly, the long chain paraffins are cracked to lighter paraffinic compounds more rapidly than the methylnaphthalenes.

During the hydrocracking operation some of the methylnaphthalenes are cracked and lost, but I have found that the cracking rate of these components of the mixture is much slower than the rates at which admixed impurities are cracked, so that very complete conversion of the other components occurs with only a relatively small loss of the methylnaphthalenes. Thus, by this step, the components having boiling points close to those of the methylnaphthalenes are cracked to lighter materials and the methylnaphthalenes are isolated in their boiling range.

The hydrocracking operation is effected over a specialized catalyst which I have found possesses the unique property of hydrocracking alkylbenzenes preferentially to methylnaphthalenes. It is recognized that many hydrocracking catalysts are known, but to my knowledge other catalysts operate far less selectively and would convert the methylnaphthalenes at generally the same rate as the close boiling impurities, so that there would be no significant isolation of the methylnaphthalenes.

The catalyst which possesses these characteristics comprises 5 to 25% chromium oxide on a high purity, low sodium content alumina support which must be of the gamma alumina type. The sodium content of the support should not exceed about 0.50%. This catalyst cracks different compounds at widely different rates, and in particular the rate at which the methylnaphthalenes are cracked is much lower than that at which the alkylbenzenes and paraffins of comparable boiling points are cracked to lighter compounds. Moreover, this catalyst also presents the major advantage that within a certain temperature range, virtually all of the admixed impurities are cracked to materials having boiling points at least 20° F. below that of beta-methylnaphthalene, so that the methylnaphthalenes are completely isolated in their boiling range.

The hydrocracking operation should be conducted with the specified catalyst at temperatures in the range of about 1200° F. to 1300° F. I have found that below 1200° F. the cracking is extremely slow while above 1300° F. the cracking operation becomes less selective, and the methylnaphthalenes themselves are cracked at about the same rate as the other components of the stock. The hydrocracking should be conducted in the presence of hydrogen, at a hydrogen/hydrocarbon ratio in the range of about 5:1 to 15:1, and preferably of about 9:1. The pressure may be between 100 and 1000 p.s.i., and the space velocity (W.H.S.V.) in the range of 0.5 to 2.0.

The catalyst preferably comprises about 11.8 chromia on the high purity, low sodium content gamma type alumina base, in which the chromia has a hexagonal crystal structure. At least one catalyst meeting these qualifications is commercially available, but it has never previously been used in the process defined herein.

The effluent from the hydrocracking operation contains naphthalenes, indenes, paraffins, alkylbenzenes and other compounds boiling below about 440° F., but almost no compounds other than methylnaphthalenes boiling in the 450–490° F. range.

The following table illustrates three specific examples of the practice of this process, using a feed of the composition previously identified in Table I.

*Table II*

CRACKING OF METHYLNAPHTHALENES IN THE PRESENCE OF MONOCYCLICS

| Test Number | 302A | 302B | 302C |
|---|---|---|---|
| W.H.S.V | 0.84 | 0.86 | 0.88 |
| Temperature, °F | 1,202 | 1,250 | 1,300 |
| Pressure, p.s.i.g | 500 | 500 | 500 |
| $H_2$/HC | 9.7/1 | 9.7/1 | 9/1 |
| Product Yield, wt. percent | 77.6 | 72.0 | 69.5 |
| Product Analysis, wt. on feed: | | | |
| Benzene | 5.9 | 14.6 | 21.4 |
| Toluene | 10.2 | 11.7 | 7.0 |
| Xylene-Indane | 17.9 | 7.1 | 1.6 |
| Indene | | 0.1 | 0.1 |
| Naphthalene | 25.7 | 31.3 | 36.3 |
| α-Methylnaphthalene | 1.6 | 0.6 | 0.2 |
| β-Methylnaphthalene | 13.6 | 5.0 | 1.7 |
| Dimethylnaphthalene plus Biphenyl | 2.3 | 1.1 | 0.6 |
| Acenaphthene | 0.1 | 0.1 | 0.1 |
| Fluorene | 0.1 | 0.1 | 0.1 |
| Heavier than Fluorene | 0.2 | 0.3 | 0.4 |
| 3 Methyl Indene, p.p.m | 1,890 | 190 | 130 |

The fractionation step which follows the hydrocracking operation is critical to obtain the alpha- and beta-methylnaphthalenes in high purity. Specifically, this operation must be a superfractionation step, utilizing a column having at least about 150 theoretical trays. I prefer to use a column having 210 actual trays which, at approximately 70% efficiency, is equivalent to 150 theoretical trays. As shown in the drawing, the fractionation is suitably conducted by passing the hydrocracking effluent to a condenser and gas separating unit in which hydrogen is disengaged from the liquified effluent, and then through a stabilizer wherein $CH_3$ is removed, and sequentially to a series of four towers. In the first of these towers, naphthalene and lighter compounds are split from the methylnaphthalenes. The methylnaphthalenes are then passed to a second tower, in which 99%+ purity beta-naphthalenes are separated as overhead. The remainder flows to a third tower, which is operated to produce an overhead comprising roughly 50% alpha-methylnaphthalene and 50% beta-methylnaphthalene, recycled to the input of the previous tower. The bottom fraction from the third tower is then fed to the fourth tower wherein 99%+ alpha-naphthalene is separated. The bottom fraction comprises mainly heavy polymer impurities, and is rejected.

In summary, by this process I have found that it is possible to produce methylnaphthalenes in much higher purity than they have previously been available, by a much more economical and efficient technique.

Having described my invention, what is claimed is:

1. The process of preparing alpha- and beta-methylnaphthalene in purities of at least 99.0 percent which comprises,
   fractionating to an end boiling point between about 490° and 500° F. a hydrocarbon feed containing said methylnaphthalenes in admixture with contaminants of the alkylbenzene and paraffin types having boiling points close to the boiling points of said methylnaphthalenes, components of said feed having boiling points substantially higher than said methylnaphthalenes thereby being removed from said feed,
   subjecting the fractionated feed to hydrocracking in the presence of hydrogen over a catalyst which comprises 5 to 25% by weight chromia deposited on a support, said support comprising a high purity low sodium content gamma type alumina, at a temperature of about 1200–1300° F., the contaminants in said fractionated stock having boiling points close to the boiling points of said methylnaphthalenes thereby being hydrocracked to compounds having boiling points no higher than about 440° F., said methylnaphthalenes being hydrocracked at a substantially lower rate than said contaminants, whereby said methylnaphthalenes are isolated in their boiling range, and superfractionating alpha- and beta-methylnaphthalene from the hydrocracked stock in a fractionating system having at least 150 theoretical trays.

2. The process of claim 1 wherein said feed is a heavy reformate.

3. The process of claim 1 wherein said feed is a cycle oil.

4. The process of preparing alpha- and beta-methylnaphthalene in purities of at least 99.0 percent which comprises, fractionating to an end boiling point between about 490° and 500° F. a hydrocarbon feed containing said methylnaphthalenes in admixture with contaminants of the alkylbenzene and paraffin types having boiling points close to the boiling points of said methylnaphthalenes, components of said feed having boiling points substantially higher than said methylnaphthalenes thereby being removed from said feed, subjecting the fractionated feed to hydrocracking in the presence of hydrogen, at a temperature in the range of about 1200–1300° F., over a catalyst which comprises 5 to 25% by weight chromia deposited on a support, said support comprising a high purity low sodium content gamma type alumina, the contaminants in said fractionated stock having boiling points close to the boiling points of said methylnaphthalenes thereby being hydrocracked to lower boiling compounds, said methylnaphthalenes being hydrocracked at a lower rate than said contaminants, whereby said methylnaphthalenes are isolated in their boiling range, and superfractionating alpha- and beta-methyl-naphthalene from the hydrocracked stock in a fractionating system having at least 150 theoretical trays.

5. The process of claim 4 wherein said catalyst comprises about 11.8% chromia on said support.

6. The process of claim 4 wherein said chromia is in the form of hexagonal crystals.

7. The process of claim 6 wherein said hydrocracking is conducted at a pressure in the range of 100–1000 p.s.i. and at a space velocity of about 0.5–2.

8. The process of preparing alpha- and beta-methylnaphthalene in purities of at least 99.0 percent which comprises, fractionating to an end boiling point between about 490° and 500° F. a hydrocarbon feed containing said methylnaphthalenes in admixture with alkylbenzene contaminants having boiling points close to the boiling points of said methylnaphthalenes, components of said feed having boiling points substantially higher than said methylnaphthalenes thereby being removed from said feed, subjecting the fractionated feed to hydrocracking at a temperature in the range of about 1200–1300° F., in the presence of hydrogen, over a catalyst which comprises 10 to 15% by weight chromia deposited on a support, said support comprising a high purity low sodium content gamma type alumina, said methylnaphthalenes thereby being isolated in their boiling range, and superfractionating alpha- and beta-methylnaphthalene from the hydrocracked stock.

References Cited by the Examiner

UNITED STATES PATENTS

| 2,858,348 | 10/1958 | Bosmajian et al. | 260—674 |
| 3,075,022 | 1/1963 | Gammon et al. | 260—672 |
| 3,116,341 | 12/1963 | Sheppard et al. | 260—674 |

FOREIGN PATENTS

| 570,855 | 2/1959 | Canada. |
| 555,981 | 9/1943 | Great Britain. |

OTHER REFERENCES

Mair et al.: Journal of Research of the National Bureau of Standards, pages 395–414, vol. 24, April 1940.

DELBERT E. GANTZ, *Primary Examiner.*

C. E. SPRESSER, *Assistant Examiner.*